United States Patent
Wang

(10) Patent No.: US 8,060,471 B2
(45) Date of Patent: Nov. 15, 2011

(54) UPDATING DISPLAY SYSTEM OF DISPLAY LIST AND METHOD THEREOF

(75) Inventor: Realman Wang, Taipei (TW)

(73) Assignee: Inventec Besta Co., Ltd., Taipei (TW)

( * ) Notice: Subject to any disclaimer, the term of this patent is extended or adjusted under 35 U.S.C. 154(b) by 587 days.

(21) Appl. No.: 12/314,466

(22) Filed: Dec. 11, 2008

(65) Prior Publication Data

US 2010/0153339 A1    Jun. 17, 2010

(51) Int. Cl.
*G06F 17/30*    (2006.01)
(52) U.S. Cl. ............... 707/638; 707/821; 709/203
(58) Field of Classification Search ............ 707/638, 707/821; 709/203
See application file for complete search history.

(56) References Cited

U.S. PATENT DOCUMENTS

| | | | |
|---|---|---|---|
| 7,386,809 B2* | 6/2008 | Kim | 715/818 |
| 2007/0162437 A1* | 7/2007 | Hwang | 707/4 |
| 2008/0004734 A1* | 1/2008 | Li et al. | 700/94 |
| 2010/0077287 A1* | 3/2010 | Ferreyra | 715/206 |

* cited by examiner

*Primary Examiner* — Cheryl Lewis
(74) *Attorney, Agent, or Firm* — Bacon & Thomas, PLLC

(57) ABSTRACT

An updating display system of a display list and the method thereof are provided. A first version information of the display list at a local end is checked against with a second version information on a server. If they are different, only a modification item file containing a data item to be modified is downloaded from the server. The display list is then modified according to a line number given in the modification item file. The data item in the display list are ordered according to the time tags in the modification item file. This can solve the problems of spending too much time in downloading the display list and an unclear play list. This helps to achieve efficient update and better display.

10 Claims, 6 Drawing Sheets

| List of Songs | 20080625 |
| Stars of the Month | 20080625 |
| System Update | 20080611 |

| 28170 | Song 1 | 20080611 |
| 28173 | Song 2 | 20080611 |
| . . . | | |
| 29748 | Song 3 | 20080611 |
| 29749 | Song 4 | 20080611 |
| 29750 | Song 5 | 20080611 |

| 28170 | Song 1 | 20080611 |
| 28172 | Song | 20080625 |
| 28173 | Song 2 | 20080611 |
| . . . | | |
| 29748 | Song 3 | 20080611 |
| 29750 | Song 5 | 20080611 |

UPDATING DISPLAY SYSTEM OF DISPLAY LIST AND METHOD THEREOF

BACKGROUND OF THE INVENTION

1. Field of Invention

The invention relates to an updating display system of a display list and the method thereof. In particular, the invention pertains to an updating display system that can download and update items with differences and clearly show the display list.

2. Related Art

Singing has become one the common leisure activities of modern life. In addition to singing at KTV, more and more families have purchased karaoke systems to sing at home. The biggest drawback of the home karaoke systems is that the songs cannot be updated in real time or the user has to update them manually. This is quite inconvenient for most users.

Thanks to advances in network technology, digital TV or set top box (STB) has started providing services similar to those of karaoke systems. In such a system, songs are stored on a server host. The digital TV or STB stores a display list of names of all songs on the server for the user to browse. After the user selects a song from the display list, the digital TV or STB downloads the song from the server for the user to sing along. When the display list of songs needs to be updated, the digital TV or STB simply download the new display list from the server via a network.

However, there are usually a large number of songs on the server. The display list file is thus sizeable. It takes some time to download the display list. Therefore, when the digital TV or STB directly downloads the display list from the server, the user usually has to wait some time before he or she can use the digital TV or STB to sing.

Besides, some songs on the server are newly released. The current technology does not have a clear display for the display list. Consequently, the user often needs to spend a long time to find the latest songs for singing. This is extremely inconvenient.

In summary, the prior art long has the problems of long display list download time and unclear display. It is imperative to provide a solution.

SUMMARY OF THE INVENTION

In view of the foregoing, the invention discloses an updating display system of the display list and the method thereof.

The disclosed system includes: a storage module, a communication module, a determining module, an editing module, an order adjusting module, and a display module. The storage module stores at least one display list and the corresponding first version information. The communication module downloads the update information file of the second version information of the display list. The determining module determines whether the first version information and the second version information of one of the display lists are the same. The editing module downloads via the communication module the modification item file of the corresponding display list from a server when the determining module finds that the first version information and the second version information are different. It further edits the display list of different version information according to the line numbers and data items. The modification item file includes at least data items, line numbers corresponding to the data items, and the time tags corresponding to the data items. The order adjusting module adjusts the order of data items in the edited display list according to the time tags. The display module displays the order-adjusted display list. The disclosed system solves the problems in the prior art by first comparing the first version information stored in the storage module and the second version information received by the communication module using the determining module. When they are different, a modification data file is downloaded for the editing module to modify the display list according to the line numbers and data items in the modification data file.

The disclosed method includes the steps of: storing at leas one display list and the corresponding first version information; downloading an update information file of a second version information of the display file from a server; downloading a modification item file corresponding to the display list of different version information from the server when the first version information and the second version information are different, the modification item file including at least one data item, the line number of the data item, and the time tag of the corresponding data item; editing the display list of a different version information according to the line numbers and the data items; adjusting the order of the data items in the edited display list according to the time tags; displaying the order-adjusted display list. The disclosed method solves the problems in the prior art by first comparing the first version information stored in the storage module and the second version information received by the communication module using the determining module. When they are different, a modification data file is downloaded for the editing module to modify the display list according to the line numbers and data items in the modification data file.

The difference between the disclosed system and method and the prior art is in that: when the invention finds that the version information of the display list at the local end is different from that on the server, the modification data file of the corresponding display list is downloaded from the server. The display list is edited according to the line numbers and data items in the modification data file. Since the modification data file only contains the parts that need to be modified, the invention easily achieves the goal of reducing the download bandwidth.

BRIEF DESCRIPTION OF THE DRAWINGS

The invention will become more fully understood from the detailed description given herein below illustration only, and thus is not limitative of the present invention, and wherein:

FIG. 4 is a schematic view of the update information file in an embodiment of the invention.

FIG. 5A shows the display list before editing.

FIG. 5B shows the display list after editing.

DETAILED DESCRIPTION OF THE INVENTION

The present invention will be apparent from the following detailed description, which proceeds with reference to the accompanying drawings, wherein the same references relate to the same elements.

Figure 1:
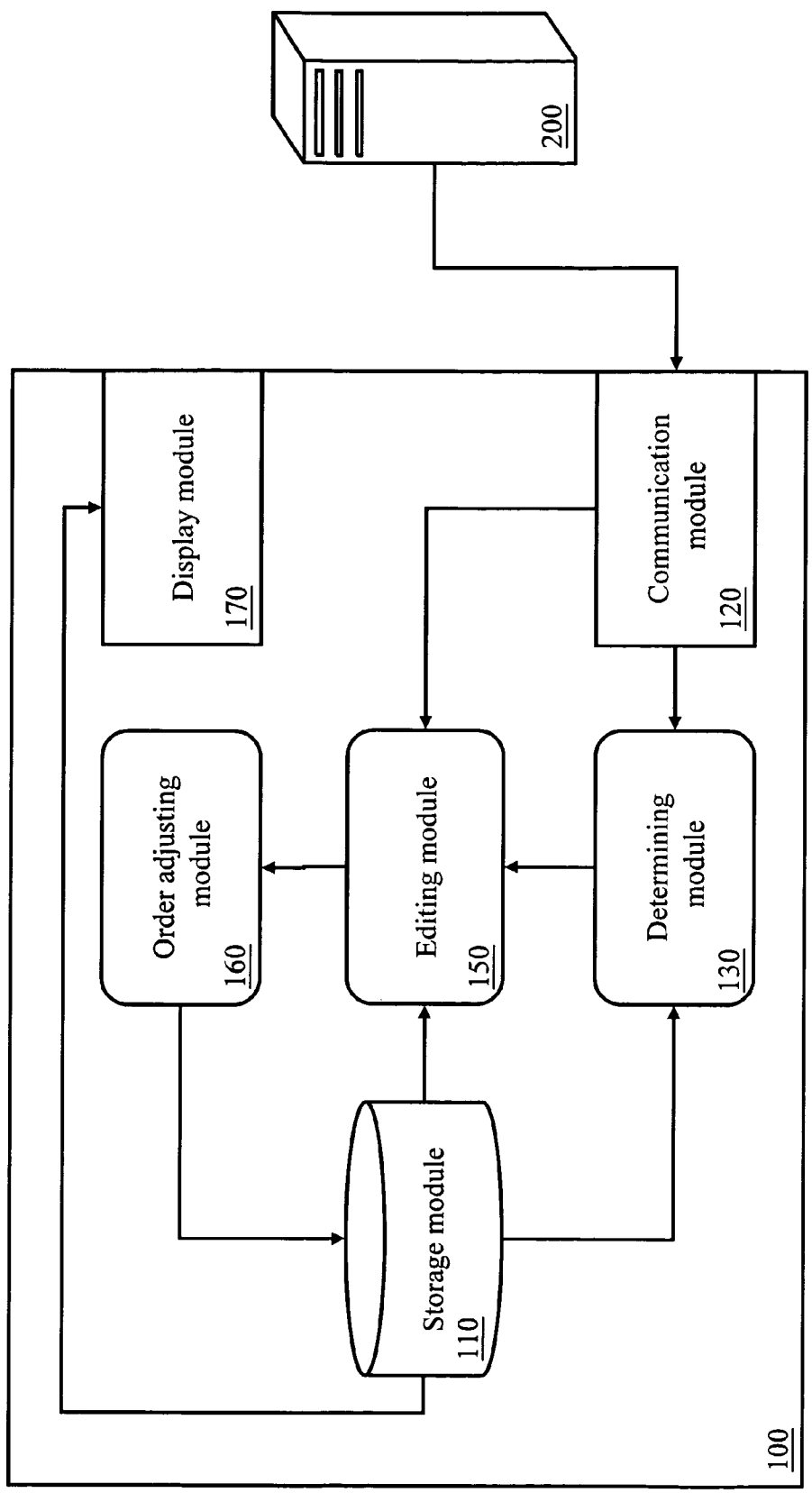
FIG. 1 shows the structure of the disclosed updating display system of display lists.

FIG. 1 shows the structure of the disclosed updating display system of the display list, illustrating its operations. As shown in the drawing, the disclosed system includes a storage module 110, a communication module 120, a determining module 130, an editing module 150, an order adjusting module 160, and a display module 170.

The storage module 110 stores at least one display list and a first version thereof. Suppose the device 100 running the disclosed system is a set top box for karaoke, the display lists include, but not limited to, List of Songs, List of Stars of the Month, and System Update.

The first version information mentioned above is used to represent the latest updated version of the display list stored in the storage module 110. The first version information can include, but not limited to, a version number and a previous update date.

The communication module 120 connects to a server 200 when the system turns on, at a particular or periodically according to user's operation or device setting. It downloads an update information file from the server 200. The update information file includes second version information of the display list stored in the storage module 110.

The above-mentioned second version information and the first version information are similar to each other. They are used to represent the latest updated version of the display list in the server 200. They can include, but not limited to, a version number and a latest update data.

The communication module 120 also downloads the modification item file of each display list. The modification item file is not an entire display list. It only contains the data in the display list that need to be modified. In addition to the data items to be modified, the modification item file also includes the line numbers and the time tags of the data items. The above-mentioned line number indicates the position of the corresponding data item in the display list. The time tag represents the update time of the corresponding data item on the server.

The determining module 130 determines whether the first version information (stored in the storage module 110) and the second version information (recorded in the update information file received by the communication module 120) corresponding to each of the display lists are the same.

When comparing the version numbers of the display lists recorded in the update information file (second version information) and the version numbers those stored in the storage module 110 (first version information), if the determining module 130 the former is newer than the latter, it means that a display list of a latter version can be downloaded from the server 200. Alternatively, if the determining module 130 finds that the latest update date in the update information file of some display list is later than the previous update date stored in the storage module 110, it means that a display list of a latter version can be downloaded from the server 200. However, the determination method of the invention is not limited to the above-mentioned the version number of latest update date comparison.

When the determining module 130 finds a newer version of any of the display lists on the server 200, the editing module 150 downloads from the server 200 the modification item file corresponding to the display list with a latter version via the communication module 120. It further edits the display list according to the line numbers and data items recorded in the modification item file.

Suppose the new display list being downloaded is the list of songs. Suppose the modification item file 400 corresponding to the display list, List of Songs, is as in FIG. 2. Each modification item in the modification item file 400 begins with (+) or (−) symbol 410 and a line number 420 (e.g., 2200, 2266). The editing module 150 follows the line numbers 420 to add the modification item with (+) into line 2200 of the List of Songs and to remove the modification item with (−) from line 2266 of it according to the modification item file 400. This completes the function of editing the display list. In fact, the format of the modification item file is not limited to the given example. Any method that the editing module 150 can follow to do the job can be used by the invention.

The order adjusting module 160 adjusts the order of the modification items in the edited display list according to the corresponding time tags. Generally speaking, the newly added data items in the more recently downloaded modification item file (i.e., the data items whose time tags are later than the previous update time in the display list) will be copied or moved by the order adjusting module 160 to the beginning of the display list. Therefore, when the display list is shown by the display module 170, the newly added items are displayed in a more prominent fashion.

The display module 170 displays the display list edited by the editing module 150 and ordered by the order adjusting module 160.

Figure 3:
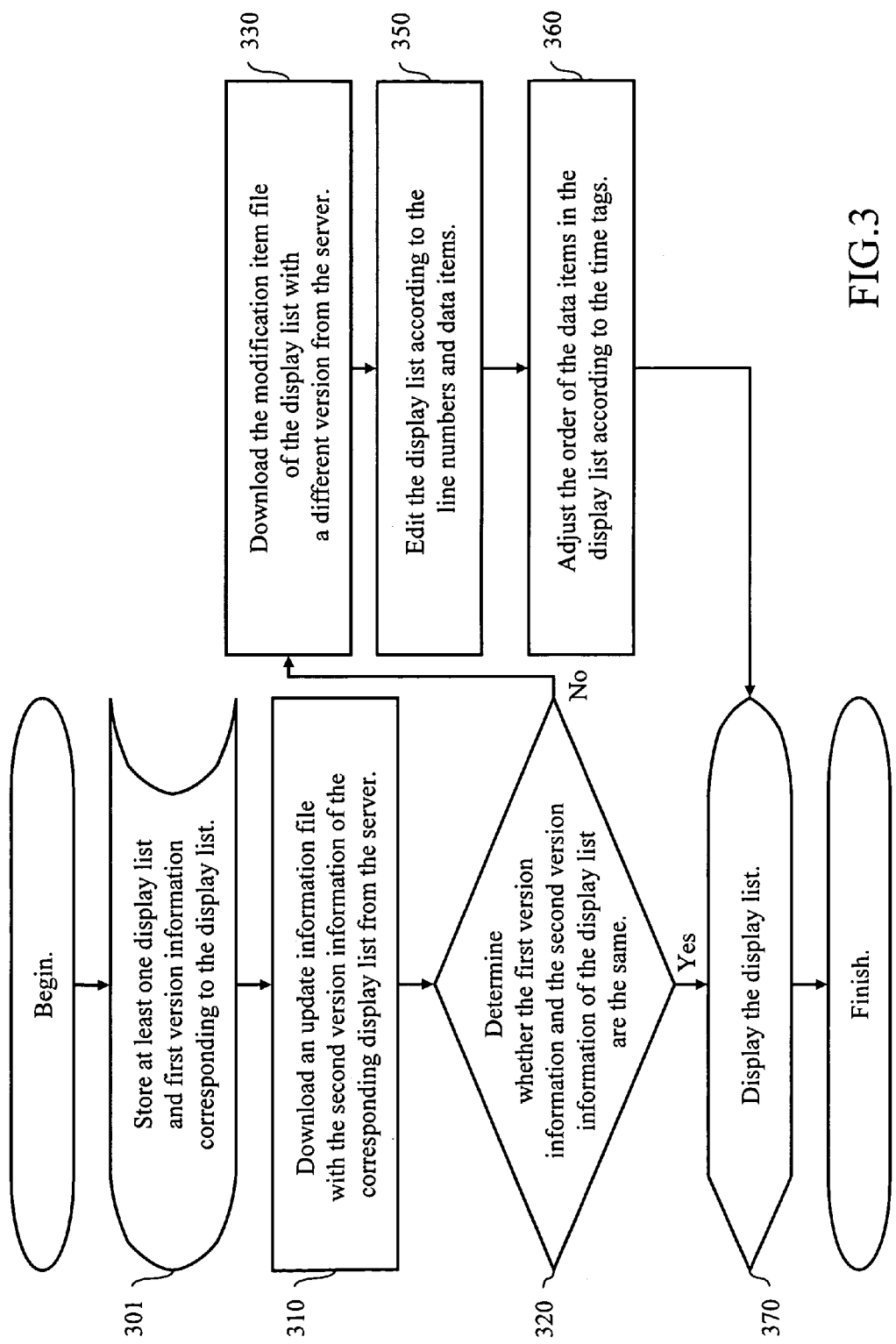
FIG. 3 is a flowchart of the disclosed updating display method of display lists.

In the following, an embodiment is used to explain the disclosed system and method. Please refer to FIG. 3 for a flowchart of the disclosed updating display method of display lists. In this embodiment, the device 100 executing the invention is a STB for karaoke as an example. The invention, however, is not restricted to this.

Before the STB in accord with the invention is sold, the storage module 110 thereof has been stored with such display lists as List of Songs and List of Stars of the Month in advance (step 301). Suppose the version information used in this embodiment is the version number. The version numbers of the display lists (List of Songs and List of Stars of the Month) are assumed to be '20080611'.

When a user turns on a STB running the invention, the communication module 120 thereof first connects to a server 200 via a network and downloads from it an update information file 500 called 'update.ini' (step 310). The downloaded filename is not necessarily 'update.ini'. Besides, the STB can execute the above-mentioned procedure at any time according to the user. Moreover, the STB can be set to automatically download the update information file at a particular time or a pre-determined time set in the STB.

Suppose the contents of the update information file 500 with the filename 'update.ini' are as shown in FIG. 4. After the communication module 120 completes downloading the update information file 500 (step 310), the determining module 130 in the STB compares the version number of the List of Songs in the update information file 500 and that stored in the storage module 110, thereby determining whether a newer version of the List of Songs exists on the server 200 (step 320).

Since the version number of the List of Songs in the update information file 500 is '20080625' while that in the storage module is '20080611', the determining module 130 thus determines that a newer version of the List of Songs exists on the server 200 for downloading.

Figure 2:
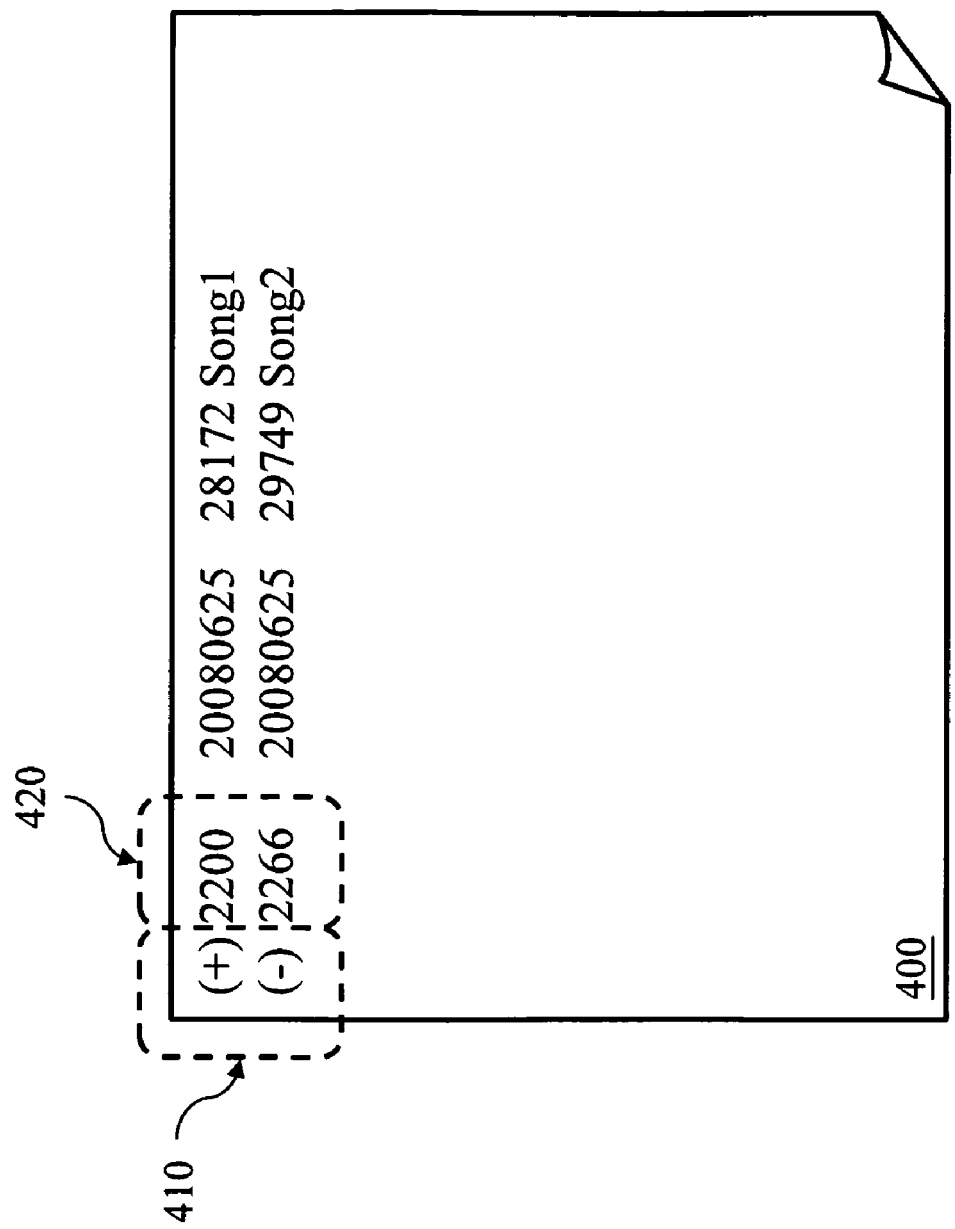
FIG. 2 is a schematic view of the modification item file in an embodiment of the invention.

After the determining module 130 determines that a newer version of the List of Songs exists on the server 200 for downloading, the editing module 150 downloads from the server 200 the modification item file 400 corresponding to the List of Songs via the communication module 120 (step 330). Suppose the modification item file 400 is as shown in FIG. 2. In particular, the modification item file does not need to contain simultaneously data items starting with symbols 410 (+) and (−). That is, the modification item file may contain only the data items starting with the symbol 410 (+) or (−).

After the editing module 150 downloads the modification item file 400 via the communication module 120 (step 330), the editing module 150 edits the display list, List of Songs, according to the modification item file 400 (step 350). Suppose the original List of Songs 600 is as shown in FIG. 5A, containing such data items as '28170 Song 1', '28173 Song 2', '29748 Song 3', '29749 Song 4', and 'Song 5'. The editing module 150 writes the data items starting with the symbol (+) in the modification item file 400 into line 2200 of the display list. It also removes the data item staring with the symbol 410 (−) in the modification item file 400 from line 2266 of the display list. The edited List of Songs 600 becomes like FIG. 5B after the updates by the editing module 150.

Besides, since in the update information file 500, the version number corresponding to the List of Stars of the Month is '20080625' while the version number of that in the storage module 110 is '20080611', the determining module 130 also determines that the List of Stars of the Month also has a newer version for downloading on the server 200. After the editing module 150 downloads via the communication module 120 the modification item file corresponding to the List of Stars of the Month from the server 200, it edits the display list according to the line numbers 420 and the data items in the modification item file by editing module 150.

When the editing module 150 writes the data items into the display list, it also writes the corresponding time tags. As shown in FIG. 5B, when the data item '28172 Song' in the modification item file 400 is written into the List of Songs 600, the editing module 150 writes the time tag '20080625' after '28172 Song'. Therefore, after the editing module 150 edits the display lists with different version information (step 350), the order adjusting module 160 adjusts the order of the data items to be displayed in each of the display lists according to the time tags (step 360). For example, the order adjusting module 160 can copy or move data items so that those with a time tag later than the previous update time are displayed in the beginning of the display list. That is, since the previous update time of the List of Songs is '20080611' whereas the data item '28172 Song' has a time tag of '20080625', the data item '28172 Song' is listed as the first one since its time tag is later than the previous update time.

Figure 6:
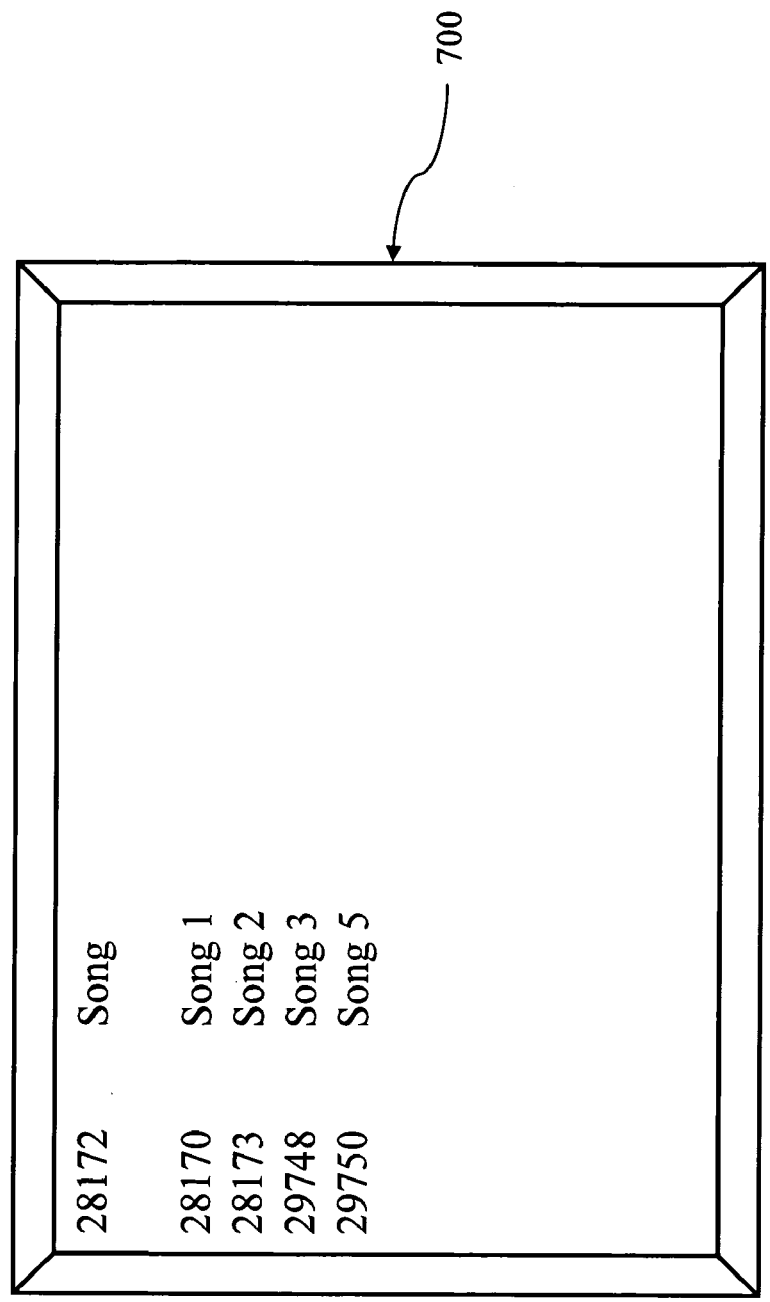
FIG. 6 is a schematic view showing the displayed screen image.

After the order adjusting module 160 adjusts the order of the data items to be displayed according to the time tags (step 360), the display module 170 displays the display list edited by the editing module 150 and ordered by the order adjusting module 160 in a display area 700 for the user to select songs (step 370), as shown in FIG. 6. Since in the display list edited by the editing module 150 the latest updated data items are moved to the beginning thereof by the order adjusting module, they are displayed to the user in a more prominent way by the display module 170. The user can readily learn which data items have been updated.

In summary, the invention and the prior art differ in that the invention has the ability in determining whether the version information of the display list at the local end is different from the version information on the server. When they are different, the corresponding modification item file is downloaded from the server. The invention then edits the display list according to the line numbers and the data items in the modification item file. Since the modification item file only contains the parts that need to be modified and the modified parts in the display list can be shown in an optimized way, the disclosed technique can solve the problems in the prior art that it takes a longer time to download the display list and that the display of new items is not prominent. Thus, the invention achieves the goals of efficient updates and optimized information display.

The disclosed display method can be implemented in hardware, software or the combination of hardware and software. It can also be implemented in a centralized way in a computer system or using different elements distributed in inter-connected computer systems.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An updating display method of display lists, comprising the steps of:
- storing at least one display list and a first version information corresponding to the display list;
- downloading an update information file of the display list with a second version information from a server;
- when determining the first version information and the second version information of one of the display lists are different, downloading a modification item file of the corresponding display list from the server, the modification item file including at least one data item, a line number of the data item, and a time tag of the corresponding data item;
- editing the display list of different version information according to the line number and the data item;
- adjusting the order of the data items in the edited display list according to the time tags; and
- displaying the order-adjusted display list.

2. The updating display method of claim 1, wherein the step of determining whether the first version information and the second version information of one of the display lists are different compares a version number/previous update time with a latest version number/update time stored in the update information file of the display list.

3. The updating display method of claim 1, wherein the step of editing the display list of different version information according to the line numbers and the data items writes the data item into the corresponding line number of the display list according to the time tag.

4. The updating display method of claim 1, wherein the step of editing the display list of different version information according to the line numbers and the data items removes the data item from the line number of the display list.

5. The updating display method of claim 1, wherein the step of adjusting the order of the data items in the edited display list according to the time tags copies or moves the data items whose time tags are later than the previous update time to the beginning of the edited display list.

6. An updating display system of display lists, comprising:
- a storage module, which stores at least one display list and a first version information thereof;
- a communication module, which downloads an update information file of the corresponding display list with a second version information from a server;
- a determining module, which determine whether the first version information and the second version information of one of the display lists are the same;
- an editing module, which downloads via the communication module a modification item file corresponding to the display list whose the first version information and the second version information are different from the server, the modification item file including at least one data item, a line number of the data item, and a time tag of the data item, and edits the display list according to the line numbers and the data items;
- an order adjusting module, which adjusts the order of the data items in the edited display list according to the time tags; and
- a display module, which displays the ordered display list.

7. The updating display system of claim 6, wherein the determining module compares a version number/previous update time stored in the storage module with a latest version number/update time stored in the update information file of the display list.

8. The updating display system of claim 6, wherein the editing module writes the data item into the corresponding line number of the display list according to the time tag.

9. The updating display system of claim 6, wherein the editing module removes the data item from the line number of the display list.

10. The updating display system of claim 6, wherein the order adjusting module moves the data items whose time tags are later than the previous update time to the beginning of the edited display list.

* * * * *